United States Patent [19]
Clark, Jr.

[11] 3,832,605
[45] Aug. 27, 1974

[54] PREFABRICATED HOUSING FOR ELECTRICAL SWITCHGEAR WITH EXTERNAL HOUSING WALL ATTACHMENT MEANS

[75] Inventor: Russell Clark, Jr., East Aurora, N.Y.

[73] Assignee: Westinghouse Electric Corporation, Pittsburgh, Pa.

[22] Filed: May 1, 1973

[21] Appl. No.: 356,266

[52] U.S. Cl............. 317/120, 317/103, 317/117, 312/257 SM, 52/284, 220/4 R
[51] Int. Cl............. H02b 1/06, H02b 1/08
[58] Field of Search............. 317/103, 120–122, 317/117, 106; 312/257 R, 257 SM, 100, 214, 223; 52/262, 267, 268, 270, 284, 285; 220/3.92, 3.94, 4 R, 4 A, 4 F

[56] References Cited
UNITED STATES PATENTS

| | | | |
|---|---|---|---|
| 2,952,799 | 9/1960 | Wortman | 317/103 |
| 2,989,226 | 6/1961 | Swartz | 220/4 R |
| 3,234,700 | 2/1966 | Creveling | 52/284 |
| 3,286,133 | 11/1966 | Sturdivan | 317/120 |
| 3,621,339 | 11/1971 | Hodgson | 317/103 |
| 3,623,784 | 11/1971 | Newfeld | 312/257 SM |
| 3,675,085 | 7/1972 | Stanback | 317/106;120 |

Primary Examiner—Robert K. Schaefer
Assistant Examiner—Gerald P. Tolin
Attorney, Agent, or Firm—L. P. Johns

[57] ABSTRACT

A prefabricated housing for electrical equipment such as switchgear having bottom, top, lower side, and upper side wall structures. The lower side wall structure comprises adjacent wall panels that are detachably secured externally to the bottom side wall structure and to the upper side wall structure. The upper side wall structure comprises wall panels that are detachably secured to the top wall structure and to the lower side wall structure. The housing comprises an access opening to the housing interior in the lower side wall structure and a U-shaped channel member on the interior side wall of the lower side wall structure that extends across the top of the access opening.

6 Claims, 4 Drawing Figures

PREFABRICATED HOUSING FOR ELECTRICAL SWITCHGEAR WITH EXTERNAL HOUSING WALL ATTACHMENT MEANS

BACKGROUND OF THE INVENTION

1. Field of the Invention:

This invention relates to a prefabricated housing, and more particularly it pertains to an outdoor environmental enclosure for electrical power conditioning and controlling equipment.

2. Description of the Prior Art:

Outdoor metal-clad switchgear housing have been used and have been disclosed in various patents including U.S. Pat. No. 2,952,799. Such housings have an advantage of being assembled on site or being completely factory built and assembled. Moreover, the factory assembled housings preferably include provisions for customer's incoming power cables and outgoing load wiring as specified. They are installed upon a foundation of piers, rails or pad-type construction for adequate load bearing and leveling together with provisions for external cabling. Such units are completely weatherproof for outdoor installation.

SUMMARY OF THE INVENTION

In accordance with this invention it has been found that a new and useful prefabricated switchgear housing may be provided which comprises a bottom wall, a top wall, and side walls, the bottom wall including a floor supported on spaced transverse beams which beams in turn are supported on spaced longitudinal beams, channel members extending around the periphery of the zone including the transverse and longitudinal beams, the side walls comprising upper and lower side wall structures, the upper side wall structures being disposed between the lower side wall structures and the top wall and enclosing an upper portion of the housing chamber, the lower side wall structures comprising adjacent wall panels detachably secured at opposite ends to the peripheral channel member and to the upper side wall structures, an access opening in the lower side wall structures, a U-shaped support member on the interior side of the lower side wall structure and extending across the top end of the access opening, and the top wall comprising a plurality of adjacent panels having inturned edge flanges, the flanges having inturned edge portions spaced from the panel surface, and the inturned edge portions of adjacent panels being interfitting.

DESCRIPTION OF THE PREFERRED EMBODIMENT

Figure 1:
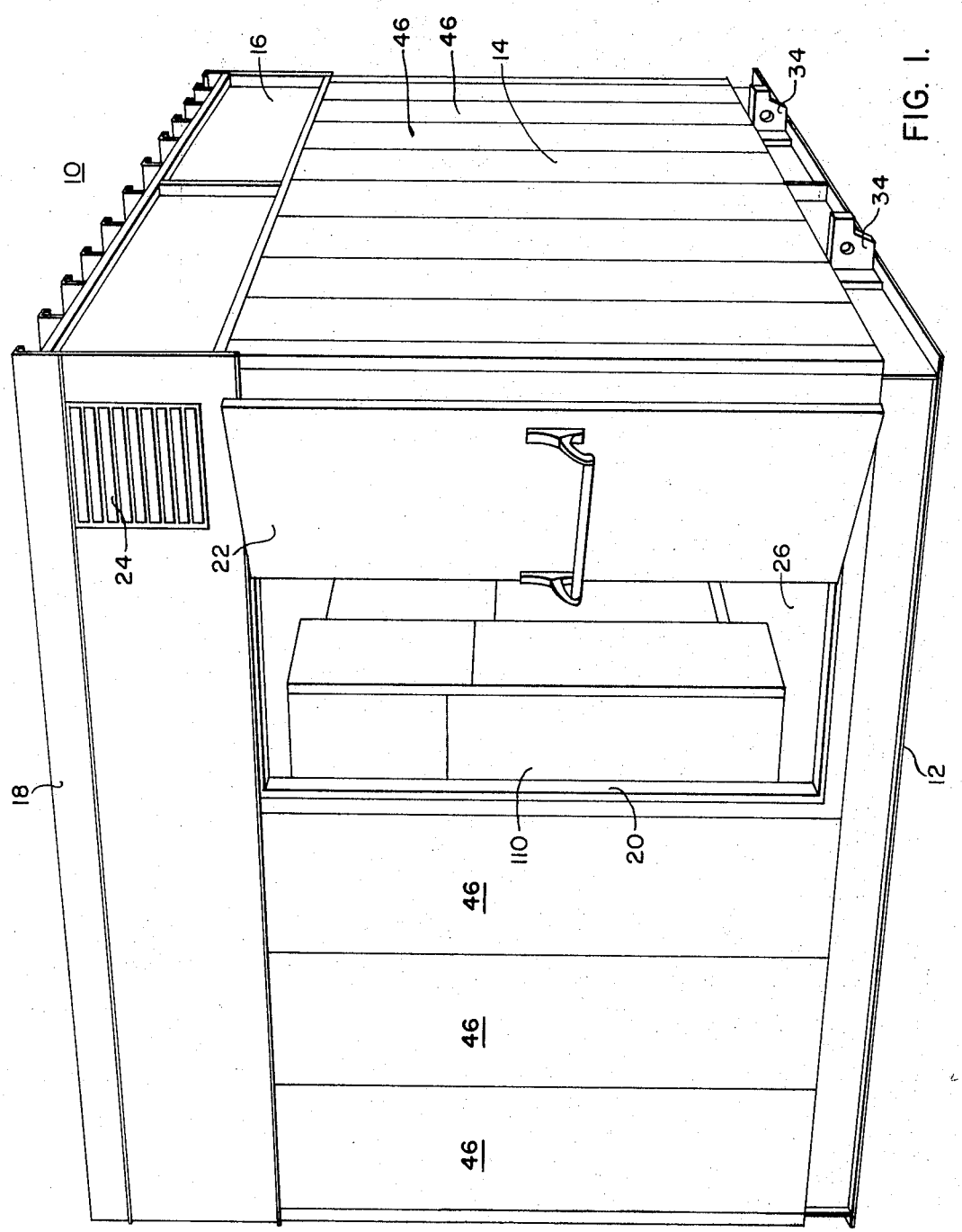
FIG. 1 is a perspective view of a prefabricated housing unit for electrical apparatus.

In FIG. 1 a prefabricated switchgear housing is generally indicated at 10 and it comprises a bottom surface structure 12, lower side wall structure 14, upper side wall structure 16, and top surface structure 18. Although the housing 10 is disclosed as having a rectangular configuration, it may have any other desirable shape such as square. Generally, the housing encloses a compartment or room and a doorway 20 and door 22 are provided for access thereto. In addition, other openings such as an opening 24 may be provided in the upper side wall structure 16 for the provision of a vent or air conditioning unit as may be necessary. The access opening or doorway 20 is located in the lower side wall structure 14 of the housing.

Figure 3:
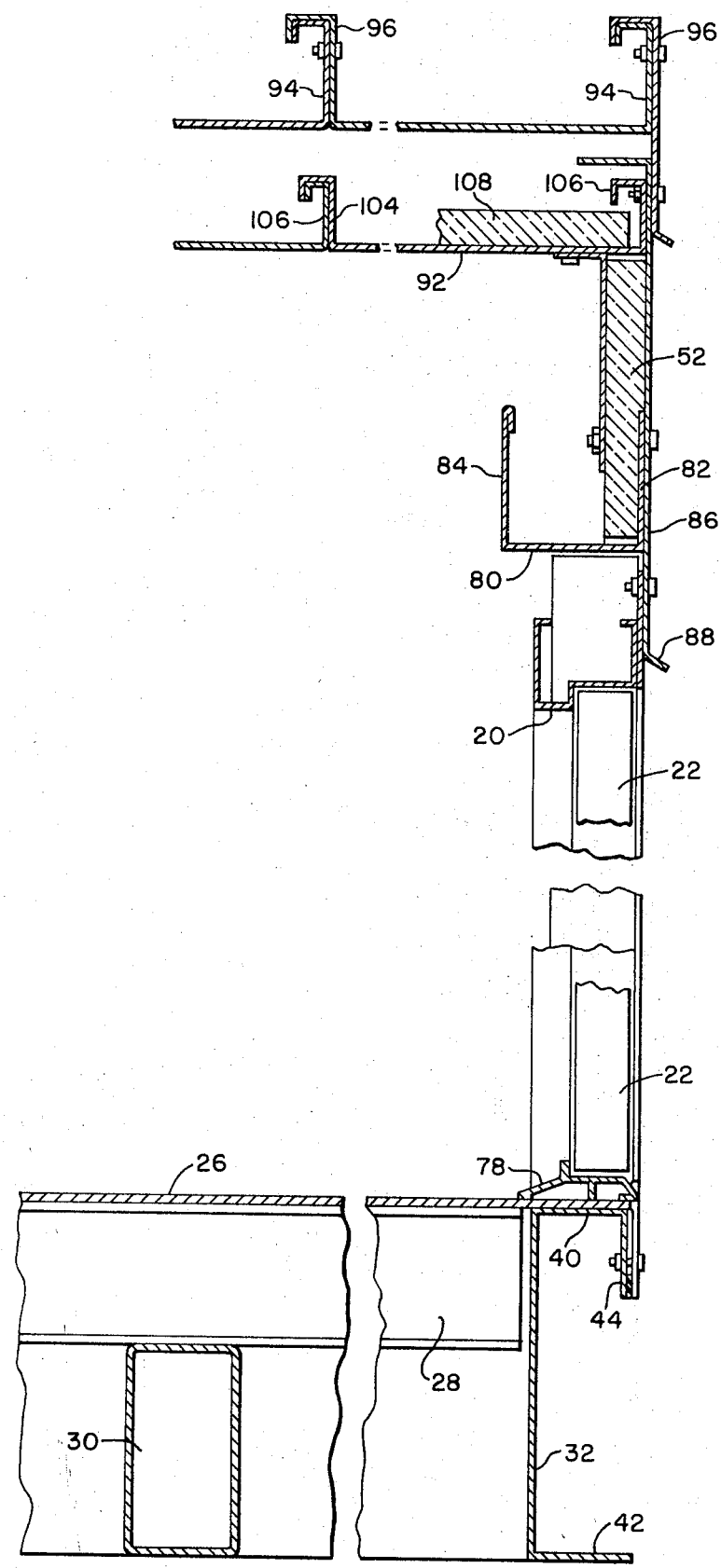
FIG. 3 is a fragmentary vertical sectional view taken through the wall portion including the doorway with the door closed.
Figure 4:
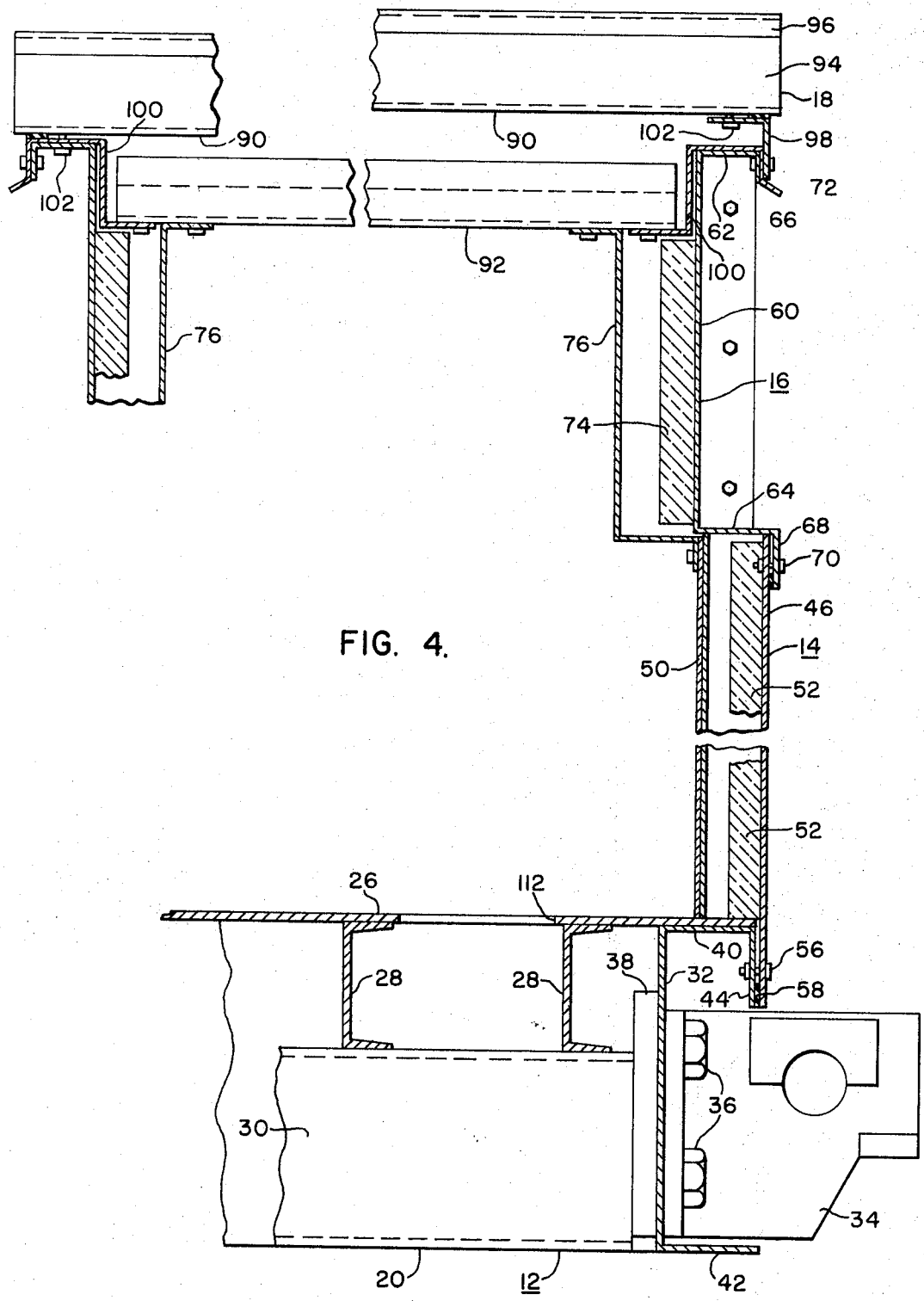
FIG. 4 is a fragmentary vertical sectional view taken through another portion of the wall and showing the top, bottom and vertical wall structures.

As shown in FIGS. 3 and 4, the bottom surface structure 12 comprises a floor 26, a plurality of spaced channels or beams 28 adjacent to the undersurface of the floor and a plurality of spaced beams 30 extending transversely to and below the beams 28. Though the beams 30 may be of any particular configuration such as channels, they are preferably tubular members (FIG. 3). In addition, the bottom surface structure 12 comprises a closure or skirt 32 which extends around the periphery of the bottom surface structure and encloses the beams 28 and 30 within the four sides of the housing. Moreover, a pair of lifting lugs 34 (FIGS. 1 and 4) are provided on opposite sides of the housing and are secured by bolts 36 to threaded plates 38 which in turn are secured to opposite ends of a pair of the beams 30 in a suitable manner such as by welding (not shown).

As shown in FIGS. 3 and 4, the closures 32 are channel members of a generally C-shaped configuration; that is, each closure member 32 includes upper and lower outturned flanges 40, 42. The upper flange 40 also includes a downturned flange 44.

As shown in FIG. 1 the lower side wall structure 14 comprises a plurality of vertically disposed panels 46 in side-by-side relation and extending from the bottom surface structure 12 to the upper side wall structure 16. More particularly, each panel 46 (FIG. 2) has a generally C-shaped cross section which includes inturned flanges 48, a wall liner 50, and wall insulation panel 52 between the panel and the liner. The wall liner 50 and the panel 52 are used optionally. It is preferred that a weather sealant strip 54 disposed between the vertical joint of each pair of vertical panels 46. The sealant strip 54 makes the housing weather and dust tight.

As shown in FIG. 4, the lower end of the panel 46 is disposed on the peripheral end portion of the floor 26 and is supported by the closure 32. A lower end portion of the panel 46 extends over the downturned flange 44 and is secured in place by spaced bolts 56. A sealant strip 58 is disposed between the panel 46 and the flange 44. The upper end of the lower side wall structure 14 (FIG. 4) is attached to a lower edge of the upper side wall structure 16. For that purpose, the upper side wall structure includes a panel 60 the vertical cross section of which is generally C-shaped with upper and lower outturned flanges 62 and 64 and with upper and lower downturned flanges 66 and 68. The upper end of the panel 46 is secured to the downturned flange 68 by spaced screws 70. Among other things, the panel 16 includes an outwardly inclined drip flange 72 at the lower edge of the flange 66. An insulation panel 74 is attached to the inner surface of the panel 60 and is enclosed within a liner 76.

Figure 2:
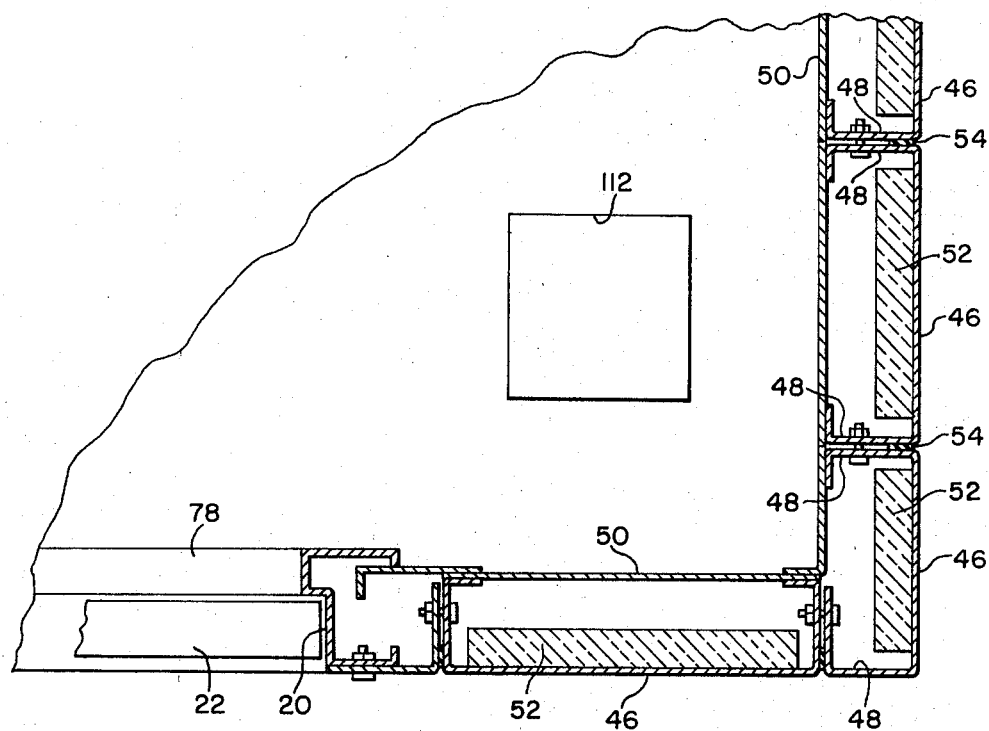
FIG. 2 is a fragmentary horizontal sectional view taken through portions of side walls forming a corner of the housing.

As shown more particularly in FIGS. 2 and 3, the door 22 is mounted within the doorway or frame 20 the lower end of which includes a threshold plate 78. The upper end of the doorway 20 includes a reinforcing member or channel 80 which has a U-shaped configuration with upturned flanges 82 and 84. The channel 80 serves to reinforce an exterior panel 86 the upper end of which is secured to the upper side wall structure 16 by spaced screws 70, and the lower end of which overlaps the horizontal portion of the doorway 20 and includes a drip flange 88. The channel 80 serves the dual purpose of providing reinforcement for the panel 86 as well as providing a gutter for wires and cables which may extend across the upper portion of the room within the housing from one side of the door to the other.

The top surface structure 18 comprises roof panels 90 as well as ceiling panels 92. A plurality of adjacent roof panels 90 extend across the top of the housing 10 and each panel includes a pair of interfitting outturned edge portions or channels 94 and 96. The channels 96 have slightly larger dimensions to permit interfitting engagement of adjacent channels 94 when assembled, thereby providing a weather-tight joint between adjacent roof panels 90. As shown in FIG. 4, the panels 90 extend between and are supported on suitable support means such as spaced angle member 98 and 100 to which the panels are secured by screws 102. The ceiling panels 92, being disposed below the roof panels 90, extend between and are supported by the angle members 100 (FIG. 4). The roof panels 90, the ceiling panels 92 include channels 104 and 106 which interfit for mutual support in a manner similar to the channels of the roof panels. The ceiling panels 92 preferably comprise wall insulation panels 108.

The several parts of the housing 10 including the upper and lower side wall structures and the top surface structures are formed members of a durable rigid material such as sheet metal and preferably of galvanized metal having an enamel surface. Manifestly, the wall insulating panels are composed of a suitable insulating material such as urethane or glass fiber.

As shown in FIG. 1, the housing has the primary purpose of providing protection for electrical equipment or switchgear, such as a circuit breaker 110 (FIG. 1), and the like. The housing 10 is adapted for incoming power cables and outgoing load wires (not shown) either through the bottom surface structure 12 for which purpose a floor opening 112 (FIGS. 2 and 4), or through the upper side wall structure 16. Where the cables pass through the bottom surface structure 12 a suitable foundation of piers, rails, or pad-type construction is provided with adequate load bearing and cable support provisions. For example, the floor opening 112 may be aligned with an access opening in a concrete pad on which the housing is mounted and through which suitable cables extend.

On the other hand, where the cables extend through the upper side wall structure openings of suitable size are provided at the desired locations for the load and line cables which lead to and from the switchgear equipment such as the circuit breaker 110. For that purpose, the cables may be mounted in suitable support means such as the member 80 over the doorway 20 between the openings in the upper side wall structures 16 and the switchgear equipment.

Accordingly, the prefabricated metal-clad switchgear housing of this invention provides suitable external means for containing switchgear equipment in a substantially weather-proof manner and is adapted for preferred customer usage by enabling cable access openings either through the bottom surface structure or the upper side wall structure. Moreover, the lower side wall panels are separately removable from the outside of the housing in order to facilitate access to the back compartments of switchgear equipment such as the circuit breaker 110 which is located against the inner surfaces of the lower side wall structures. Finally, the housing is conducive to the attachment of additional modular wall units in either direction but preferably longitudinally where necessary.

What is claimed is:

1. A prefabricated metal-clad switchgear housing comprising bottom wall structure, top wall structure, a plurality of upper and lower side wall structures which enclose a chamber, said upper side wall structures being disposed between the lower side wall structure and the top wall structure to enclose an upper portion of the chamber, the lower side wall structure comprising adjacent wall panels detachably secured at opposite ends externally to the bottom wall structure and externally to the upper side wall structure, the upper side wall structure being detachably secured externally to the top wall structure, an access opening to the chamber in the lower side wall structure, the lower side wall structure being detachably secured externally to the bottom wall structure, a U-shaped support member attached to the inner side of the upper side wall structure and extending across the top end of the access opening.

2. The housing of claim 1 in which the bottom wall structure comprises a floor, floor support means thereunder and a C-shaped peripheral member around the floor support means.

3. The housing of claim 2 in which the lower side wall structure is detachably secured to the C-shaped peripheral member.

4. The housing of claim 2 in which the floor support means comprises first spaced floor beams adjacent the floor and second spaced beams below and adjacent to the first spaced beams.

5. The housing of claim 4 in which the second spaced beams are tubular.

6. The housing of claim 1 in which the top wall structure comprises a plurality of adjacent panels having outturned edge flanges, the flanges having inturned edge portions spaced from the panel surface, and the inturned edge portions of adjacent panels being interfitting.

* * * * *